United States Patent [19]

Okita et al.

[11] 4,407,853
[45] Oct. 4, 1983

[54] PROCESS FOR PRODUCING A MAGNETIC RECORDING MEDIUM

[75] Inventors: Tsutomu Okita; Kyoichi Naruo, both of Fujinomiya; Goro Akashi, Odawara, all of Japan

[73] Assignee: Fuji Photo Film Co., Ltd., Kanagawa, Japan

[21] Appl. No.: 364,346

[22] Filed: Apr. 1, 1982

[30] Foreign Application Priority Data

Apr. 2, 1981 [JP] Japan ................................. 56-49887

[51] Int. Cl.$^3$ ...................... H01F 10/02; B05D 3/06
[52] U.S. Cl. ...................................... 427/44; 427/48; 427/128; 427/130
[58] Field of Search .................... 427/44, 48, 128, 131

[56] References Cited

U.S. PATENT DOCUMENTS 4,332,834 6/1982 Takei ..................................... 427/48
4,343,831 8/1982 Tsuji et al. ...................... 427/128 X

*Primary Examiner*—Bernard D. Pianalto
*Attorney, Agent, or Firm*—Sughrue, Mion, Zinn, Macpeak and Seas

[57] ABSTRACT

A process for producing a magnetic recording medium by applying onto a base a magnetic coating composition comprising ferromagnetic particles dispersed in a solution comprising a compound polymerizable by electron beams and a low boiling solvent is disclosed. The ferromagnetic particles in the applied magnetic coating are oriented while it is still wet, and thereafter the oriented web is irradiated with electron beams within 5 seconds after orientation to retain the ferromagnetic particles orientation and the web is dried by evaporating the solvent.

3 Claims, No Drawings

PROCESS FOR PRODUCING A MAGNETIC RECORDING MEDIUM

FIELD OF THE INVENTION

The present invention relates to a process for producing a magnetic recording medium comprising a base onto which a magnetic coating composition comprising a dispersion of ferromagnetic particles in a binder has been applied. More particularly, the invention relates to a process for producing a magnetic recording medium wherein the magnetic particles are held in a uniformly dispersed state and are oriented evenly in a desired direction.

BACKGROUND OF THE INVENTION

With the recent expansion of the applications of magnetic recording media, there has developed a need for magnetic recording media having good magnetic characteristics, particularly a high S/N ratio, especially in recent years with the increasing demand for better video and audio tapes.

To meet this demand, the magnetic particles in the magnetic coating must be uniformly dispersed and oriented in the binder thereof. Conventionally, the dispersibility of magnetic particles is improved and tape noise is reduced by; (1) producing finer magnetic particles; (2) adding a dispersant (surfactant or the like); (3) adding an agent to prevent cohesion of the magnetic particles (e.g., by adding solid particles) or (4) using a powerful dispersing device.

However, the present inventors have found that no matter how uniformly the magnetic particles are dispersed in the coating composition, they cohere during drying of the applied magnetic coating to thereby impair uniform dispersion of the magnetic particles. This problem can be avoided to some extent by increasing the viscosity of the magnetic coating composition or by adding an agent to prevent cohesion of the magnetic particles (e.g., by addition of solid particles), but there is a limit to the effectiveness of such methods since a highly viscous coating composition is difficult to apply and filter and because too large solid particles cannot be used.

A method is known for improving the orientation of the magnetic particles and providing better magnetic characteristics by passing the magnetic particles under a strong magnetic field and orienting them in the direction of coating application just after application and before evaporation of the solvent. But no matter how powerful the magnet is, it usually takes at least 10 seconds to evaporate the solvent, and, during this period the fluidity of the composition and free movability of the magnetic particles disturb the orientation of the magnetic particles, and in an extreme case, the orientation is completely lost. To prevent this, an even higher viscous magnetic coating composition may be prepared; however, then the magnetic particles cannot be oriented satisfactorily in a magnetic field having ordinary strength, and, if a stronger magnet is used, the surface roughness of the coating is increased to cause more noise and dropout. If the drying speed is increased, the smoothness of the surface of the coating is impaired by the drying air.

SUMMARY OF THE INVENTION

Therefore, one object of the present invention is to provide a process for producing a very smooth magnetic coating wherein the magnetic particles are uniformly dispersed and oriented.

To achieve this object, according to the present invention a magnetic coating composition having magnetic particles dispersed in a solution made up of a compound polymerizable by electron beams and a low boiling solvent is applied to a base, the magnetic particles are oriented immediately after application, the magnetic coating is immediately exposed to electron beams to polymerize it in the presence of the solvent so as to prevent cohesion and uneven orientation of the magnetic particles, and then the solvent is evaporated to dry the magnetic coating.

DESCRIPTION OF PREFERRED EMBODIMENTS

Production of a magnetic recording tape by irradiation with electron beams is described in Japanese Patent Publication No. 12423/72, but this prior art method basically differs from the process of the present invention. In the prior art method, a composition having ferromagnetic particles dispersed in a mixture of a binder system curable by electron beams and a low boiling solvent is applied onto a plastic base film, the magnetic coating is preliminarily dried to remove the low boiling solvent, and then the coating is irradiated with electron beams to cure the binder system containing the magnetic particles. In the process of the present invention, the applied magnetic coating is passed through a magnetic field for orientation, and immediately thereafter the coating is irradiated with electron beams without evaporating the low boiling solvent.

According to the prior art method, no matter how uniformly the magnetic particles are dispersed and oriented in the freshly applied coating, the magnetic particles cohere and their orientation is upset during evaporation of the solvent. As a result, a desired magnetic coating having the magnetic particles dispersed and uniformly oriented therein cannot be formed on the base. Noting this point, the present inventors have produced a magnetic recording medium by applying a dispersion of magnetic particles to a base, orienting the magnetic particles, and immediately thereafter irradiating the coating with electron beams. Since the polymerization of the magnetic coating proceeds rapidly ($10^{-3}$ minute or less) under exposure to electron beams, part or all of the binder system is polymerized rapidly enough to prevent re-cohesion of the magnetic particles and upsetting of their orientation due to the increase in the viscosity of the magnetic coating composition, so as to form a magnetic coating on the base wherein the magnetic particles are uniformly dispersed and oriented.

According to another feature of the present invention, upon irradiation with electron beams part or all of the binder is polymerized to fix the magnetic particles, but the irradiated magnetic coating still contains the low boiling solvent and is in a swollen state, and, therefore, by evaporating the solvent in a subsequent drying step under suitable conditions, the magnetic coating can be provided with a sponge-like porous structure (degree of porosity: 2–40%, pore size: about $0.01$–$0.5\mu$) wherein the spaces through which the solvent has evaporated remain as pores. These pores serve as an anchor to retain a lubricant incorporated in the magnetic coating to provide a magnetic recording medium having good runnability. If the magnetic recording medium is in a tape form, curring due to the internal stress ocurred after evaporation of the solvent can be prevented or controlled by changing pore volume (e.g., by controlling the evaporation amount, the irradiation amount, etc.) since the pores minimize. A further advantage of the pores is that they help reduce the thickness of the magnetic coating greatly in a subsequent calendering step, and thus provide a smooth magnetic surface and orient the magnetic particles uniformly across the thickness of the coating. As a consequence, a magnetic recording medium having higher S/N ratio can be produced.

None of these advantages of the pores is described in Japanese Patent Publication No. 12423/72, to say nothing of other prior art references. They are achieved only by irradiating the applied magnetic coating with electron beams immediately after orientation of the megnetic particles so as to polymerize the binder and fix the magnetic particles at the same time.

The compound polymerizable by electron beams is such that it has one or more carbon-carbon unsaturated bonds. Examples are compounds containing an acryloyl group, acrylamido group, allyl group, vinyl ether gorup or vinyl thioether group, and unsaturated polyesters.

Specific examples include unsaturated aliphatic acids such as acrylic acid and 2-butenoic acid, unsaturated polybasic acids such as maleic acid, fumaric acid, 2-butene-1, 4-dicarboxylic acid and muconic acid; unsaturated aliphatic acid amides such as acrylamide, crotonamide, 2-penteneamide and maleinamide; acrylic acid alkyl esters such as methyl acrylate, ethyl acrylate and butyl acrylate, styrene and styrene derivatives such as α-methylstyrene and β-chlorostyrene p-methylstyrene, p-ethylstyrene, p-vinylstyrene, o-chlorostyrene, and p-methoxystyrene; acrylonitrile, vinyl acetate and vinyl propionate. Two or more unsaturated bonds may be present in the molecule.

Examples of such compounds are found in *Kankosei Jushi Data-Shu* (*A List of Data on Photosensitive Resins*), published by Sogo Kagaku Kenkyusho, December 1968, pp 235–236. Particularly preferred compounds are unsaturated esters of polyols having at least two OH groups at terminal ends of the straight chain or in the side chains such as ethylene diacrylate, diethylene glycol diacrylate, glycerol triacrylate, ethylene diacrylate and pentaerythritol tetraacrylate, and glycidyl acrylate. A compound having one unsaturated bond in the molecule is preferably used in combination with a compound having two or more unsaturated bonds to improve the durability of the magnetic recording medium.

These compounds may have a high molecular weight of 1,000 to 20,000 to which they are by no means limited. Particularly preferred compounds are those which have an acrylate gorup at terminal ends of the straight chain or in the side chain, and these compounds are described in A. Vrancken, *Fatipec Congress*, 11, 19 (1972). An example is given below:

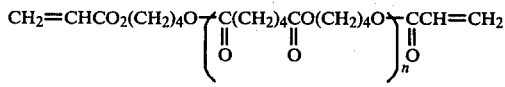

The polyester unit of the above formula may be replaced by a polyurethane unit, epoxy resin unit, polyether unit and polycarbonate unit or a mixture thereof.

While the above named monomers and polymers may be used alone or in admixture, a mixture of the monomers and polymers is preferably used as the compound polymerizable by electron beams so as to increase the mechanical strength and durability of the binder. In this case, the ratio of monomer to polymer is not limited, but generally from 1/9 to 5/5 (by weight).

If desired or necessary, thermoplastic resins such as vinyl chloride/vinyl acetate copolymers, cellulosic resins, acetal resins, vinyl chloride/vinylidene chloride compolymers, urethane resins and acrylonitrile/butadiene compolymers may be added alone or in admixture to the magnetic coating composition of the present invention as an additional binder component for increasing the mechanical strength of the binder.

The compound polymerizable by electron beams is used preferably in an amount of from 3 to 100 wt%, more preferably from 8 to 100 wt%, on the basis of the weight of the binder components in the magnetic coating composition (the organic components of the composition excluding the organic solvent and additives set forth below). If the amount of the compound is too small, the viscosity is not greatly increased and it does not gel adequately upon irradiation with electron beams, and as a result, the oriented magnetic particles are not permanently fixed. The total of the binder components in the magnetic coating composition is preferably 0.1 to 7 parts by weight, more preferably from 0.2 to 0.5 part by weight per part by weight of the ferromagnetic particles.

Suitable ferromagnetic particles are finely divided ferromagnetic iron oxide, chromium dioxide and alloys. The ferromagnetic iron oxide and chromium dioxide particles have a length to breadth ratio (acicular ratio) of from about 2/1 to 20/1, preferably at least 5/1, and an average length of from about 0.2 to 2.0 μm. The ferromagnetic alloy particles are such that at least 75 wt% thereof is a metal and at least 80 wt% of the metal is made of a ferromagnetic metal (i.e., Fe, Co, Ni, Fe—Co, Fe—Ni, Co—Ni, Fe—Co—Ni) and the same have a major axis of not more than about 1.0 μm and a minor axis of not more than 0.2 μm.

Suitable organic solvents include ketones such as acetone, methyl ethyl ketone, methl isobutyl ketone and cyclohexanone; esters such as methl acetate, ethyl acetate, butyl acetate, ethyl lactate, and glycol acetate monoethyl ether; ethers and glycol ethers such as glycol dimethyl ether, glycol monoethyl ether and dioxane; aromatic hydrocarbons such as benzene, toluene and xylene; and chlorinated hydrocarbons such as methylene chloride, ethylene chloride, carbon tetrachloride, chloroform, ethylene chlorohydrin and dichlorobenzene. The organic solvent has preferably a boiling point of from 50° to 200° C. The propotion of the organic solvent in the magnetic coating composition is not limited, but preferably from 0.5 to 3 parts by weight per part by weight of the ferromagnetic particles.

The magnetic coating composition of the present invention may further contain conventunal additives such as a lubricant, abrasive agent, corrision inhibitor or antistatic agent. Examples of lubricants are a saturated or unsaturated higher aliphatic acid, aliphatic acid ester, higher aliphatic acid amide, higher alcohol, silicone oil, mineral oil, edible oil, and fluorine-containing compound. These lubricants may be added at the time the magnetic coating composition is prepared or, they can be spread or sprayed onto a dried or smoothed magnetic coating eigher directly or in the form of a solution in an organic solvent. Examples of abrasive agents are alumina powder, chromium oxide, corundum, etc. as described in, for example, U.S. Pat. Nos. 3,630,910, 3,833,412. Examples of corrosion inhibitors are amines, amides, imides, etc. as described in Japanese Patent Application (OPI) Nos. 63494/76 and 41204/78. Examples of antistatic agents are carbon black powder, saponiun, alkylene oxides, etc.

The coating composition can be prepared by charging a mixer with the magnetic particles and all other ingredients simultaneously or sequentially. A dispersant may be added simultaneously with the magnetic powder and then the compound that can be polymerized by electron beams and the optional thermoplastic resin may be added. In the case, the dispersant is generally added in an amount of 0.05 to 5 wt% based on the weight of the ferromagnetic particles. Examples of dispersants are aliphatic acids, aliphatic acid amides, aliphatic amines, phosphates, alcohols, quaternary ammonium salts, silane coupling agetns, titanium coupling agents, etc.

Various conventional mixers may be used to achieve thorough mixing of the magnetic coating composition. Examples include two-roll mill, ball mill, sand grinder, disperser, high speed impeller disperser and high speed mixer homogenizer. A magnetic coating is formed from the magnetic coating composition on a base by conventional doctor coating, blade coating, air knife coating, squeeze coating, reverse roll coating or gravure coating.

The magnetic coating composition is applied to the base to form a coating having a dry thickness of from about 0.5 to 15 μm. The dry thickness of the magnetic coating is determined by the use, shape and other specifications of the magnetic recording medium in a manner known in the art.

The magnetic particles in the coating thus formed on the base are oriented in an a.c. or d.c. magnetic field having a magnetizing force of about 500 to 3,000 Oe. The direction of orientation is determined by the use of the magnetic medium. For audio tape, small video tape and memory tape, the direction is parallel to the tape length, whereas for broadcasting video tape the direction of orientation is 30 to 90 degrees off the tape length. The orientation can be performed with a permanent magnet, solenoid coil or magnetic blade. For details of orientation using these devices, see U.S. Pat. Nos. 1,949,840, 2,796,359, 3,001,891, 3,172,776, 3,416,949, 3,473,960 and Japanese Patent Publication Nos. 3427/57, 28368/64, 23624/65, 23625/65, 13181/66, 13043/73 and 39722/73.

Suitable electron beam accelerators include a Van de Graaff scanning accelerator, double scanning accelerator and curtain beam accelerator. A curtain beam accelerator is preferred for its low price and high power output. The acceleration voltage is generally 100 to 1,000 kilovolts, preferably 150 to 300 kilovolts. The adsorbed dose is generally from 0.5 to 20 megarads, preferably from 2 to 10 megarads. An acceleration voltage lower than 100 kilovolts results in insufficient energy transmission, and an voltage higher than 1,000 kilovolts reduces the energy efficiency necessary for polymerization. If the adsorbed dose is less than 0.5 megarads, the curing reaction is not sufficient to prevent a magnetic material having high strength, and if the dose is greater than 20 megarads, the efficiency of energy used for curing is reduced or the web being irradiated generates heat, and in particular, the plastic base may deform.

The interval between the orientation of the magnetic particles and irradiation of the applied magnetic coating with electron beams is such that the solvent does not evaporate completely and the magnetic coating composition remains fluid. The coating is irradiated with electron beams within 5 seconds, preferably within 1 second, after orientation. The irradiation and orientation may be performed at the same time, if desired. By the irradiation the viscosity of the magnetic coating increases (generally from 20 cp or less to more than 100 cp when measured at the shear rate of $10^{-3}$ sec) to retain the magnetic particles uniformly dispersed and oriented in the coating.

The cured magnetic coating is generally dried at between about 50° and 120° C., preferably between 70° and 100° C., more preferably between 80° and 90° C., for a duration of from about 10 seconds to 10 minutes, preferably from 20 seconds to 5 minutes, with air supplied at a rate of 1 to 5 kl/m$^2$, preferably 2 to 3 kl/m$^2$.

The surface of the magnetic coating may optionally be smoothed by calendering or other suitable means conventionally used in the production of magnetic recording media. For smoothing the surface of the magnetic coating, calendering is performed with two mirror finishing rolls or with a mirror finishing roll and an elastic roll. The mirror finishing roll may be a metal roll, and the elastic roll may be a cotton roll or synthetic resin (e.g., nylon or polyurethane) roll.

Preferably, the magnetic coating is calendered with a train of 1 to 30 rolls at a nip pressure of about 25 to 100 kg/cm$^2$ at a temperature between about 10° to 150° C., more preferably 10° and 100° C., and at a rate of 5 to 200 m/min. Higher temperatures and nip pressures may result in magnetic layer shed or base deformation. If the calendering speed is less than about 5 m/min, the desired smoothing effect is not achieved, and if it is more than about 200 m/min, smoothing becomes difficult.

In the process of the present invention, the magnetic layer is smoothed by mirror finishing rolls after the organic solvent is completely or partially removed from the magnetic layer. The organic solvent may be present not more than 10 wt% based on the amount of the ferromagnetic particles at the time of the smoothening treatment. For instance, the web can be left to stand or dry under ambient conditions to remove all or part of the organic solvent, and then the web smoothed.

Any conventional base can be used in the present invention if it is not dissolved in the organic solvent used in the magnetic coating composition. Suitable bases include polyesters such as polyethylene terephthalate and polyethylene-2, 6-naphthalate; polyolefins such as polyethylene and polypropylene; cellulose derivatives such as cellulose triacetate; polycarbonate, polymide and polyamidemide; non-magnetic metals such as aluminum, copper, tin, zinc and non-magnetic alloys including the same; paper, and paper coated or laminated with polyolefins. The non-magnetic base may be in the form of a film, tape, sheet, disc, card, drum or other suitable shape, and a suitable material is selected from among various materials depending on its form. The back surface (opposite the side having the magnetic coating) of the base may be provided with a conventional back coating for various purposes, e.g., prevention of static buildup, recording transfer and wow or flutter, as well as improving the strength of the magnetic recording medium and the matting of the back surface.

According to the present invention, a magnetic recording material having surprisingly good electrical characteristics can be produced.

The present invention is now described in greater detail by reference of the following examples and comparative examples which are given here for illustrative purposes only and are by no means intended to limit its scope. In the examples and comparative examples, all parts are by weight.

EXAMPLE 1

A composition having the formulations indicated below was agitated in a ball mill for 50 hours.

| | |
|---|---|
| $\gamma$-$Fe_2O_3$(acicular ratio : 8, length : 0.5 $\mu$m) | 100 parts |
| Nitrocellulose (RS-H of Daicel Ltd., dinitric ester of cellulose) | 10 parts |
| Urethane resin (condensate of adipic acid, butanediol and tolylene diisocyanate, molecular weight : about 30,000) | 10 parts |
| Acrylic acid | 0.5 part |
| Ester acrylate oligomer (Aronix M6100 of Toagosei Chemical Co., Ltd., diacrylate, molecular weight : about 3,000) | 2 parts |
| Hexamethylene diacrylate | 2 parts |
| Methyl ethyl ketone | 250 parts |
| Stearic acid | 1 part |
| Butyl stearate | 1 part |

The resulting magnetic coating composition was applied to a polyethylene terephthalate base (20$\mu$ thick) by a doctor blade to form a magnetic layer in a dry thickness of 8$\mu$. The magnetic particles were oriented with a cobalt magnet (3,000 Oe), and within one second the web was irradiated with electron beams to give an absorbed dose of 5 megarads (acceleration voltage: 165 kilovolts, beam current: 5 milliamperes). The web was then dried by evaporating the solvent at 100° C. for one minute.

COMPARATIVE EXAMPLE 1

A magnetic tape was prepared as in Example 1 except that the web was dried before irradiation with electron beams.

EXAMPLE 2

A magnetic coating composition was prepared as in Example 1 except that a magnetic coating composition having the formulation indicated below was used.

| | |
|---|---|
| $\gamma$-$Fe_2O_3$(same as in Example 1) | 100 parts |
| Methyl acrylate | 20 parts |
| Acrylic acid | 2 parts |
| Methyl ethyl ketone | 150 parts |
| Stearic acid | 1 part |
| Butyl stearate | 1 part |

COMPARATIVE EXAMPLE 2

A magnetic tape was prepared as in Example 2 except that the web was dried before irradiation with electron beams.

The squareness ratio (residual flux density/maximum flux density) of the four magnetic tape samples is given below.

| Run No. | Squareness ratio |
|---|---|
| Example 1 | 0.83 |
| Comparative Example 1 | 0.76 |
| Example 2 | 0.82 |
| Comparative Example 2 | 0.73 |

While the invention has been described in detail and with reference to specific embodiments thereof, it will be apparent to one skilled in the art that various changes and modifications can be made therein without departing from the spirit and scope thereof.

What is claimed is:

1. In a process for producing a magnetic recording medium by applying onto a base a magnetic coating composition comprising ferromagnetic particles dispersed in a solution comprising a compound polymerizable by electron beams and a low boiling solvent, irradiating the web with electron beams and drying the irradiated web, the improvement wherein the ferromagnetic particles are oriented while the applied magnetic coating composition is still wet and the oriented web is irradiated with electron beams within 5 seconds after orientation and dried by evaporating the solvent.

2. A process according to claim 1, wherein the web is irradiated with electron beams within 1 second after thhe orientation of the magnetic particles.

3. A process according to claim 1, wherein the magnetic coating composition contains at least 3 wt% of the compound polymerizable by electron beams on the basis of the binder components.

* * * * *